United States Patent
Jackson

(10) Patent No.: US 8,793,737 B2
(45) Date of Patent: Jul. 29, 2014

(54) MULTIPLE INPUT TELEVISION RECEIVER

(75) Inventor: Markus Wayne Jackson, Castle Rock, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 96 days.

(21) Appl. No.: 13/072,346

(22) Filed: Mar. 25, 2011

(65) Prior Publication Data

US 2011/0234906 A1 Sep. 29, 2011

Related U.S. Application Data

(60) Provisional application No. 61/317,843, filed on Mar. 26, 2010.

(51) Int. Cl.
- *H04N 5/445* (2011.01)
- *G06F 13/00* (2006.01)
- *G06F 3/00* (2006.01)

(52) U.S. Cl.
USPC ............................... 725/49; 725/48; 348/555

(58) Field of Classification Search
USPC ...................................... 348/555; 725/48–49
See application file for complete search history.

(56) References Cited

U.S. PATENT DOCUMENTS

| | | | |
|---|---|---|---|
| 4,630,113 A * | 12/1986 | Long | 725/151 |
| 5,883,677 A * | 3/1999 | Hofmann | 348/584 |
| 5,923,379 A * | 7/1999 | Patterson | 725/70 |
| 6,072,983 A | 6/2000 | Klosterman | |
| 6,182,287 B1 * | 1/2001 | Schneidewend et al. | 725/48 |
| 6,219,839 B1 * | 4/2001 | Sampsell | 725/40 |
| 6,603,517 B1 | 8/2003 | Shen et al. | |
| 2002/0170073 A1 * | 11/2002 | Miller et al. | 725/139 |
| 2003/0151698 A1 | 8/2003 | Ishihara et al. | |
| 2006/0095947 A1 | 5/2006 | Russ | |
| 2009/0133072 A1 | 5/2009 | Wehmeyer | |
| 2009/0133073 A1 * | 5/2009 | DaLaCruz et al. | 725/49 |

FOREIGN PATENT DOCUMENTS

WO 03/021941 A1 3/2003

OTHER PUBLICATIONS

International Search Report and Written Opinion of PCT/US2011/029566 mailed on Jul. 29, 2011, 18 pages.

* cited by examiner

*Primary Examiner* — Hunter B Lonsberry
(74) *Attorney, Agent, or Firm* — Kilpatrick Townsend & Stockton LLP

(57) ABSTRACT

Disclosure is generally directed to a television receiver with multiple inputs, some accepting a local broadcast and some accepting satellite transmissions or transmissions across another network. The television receiver may pass local transmissions through to a display in their original form and at their original frequency, while retuning the display to receive the transmission at its original frequency. The television receiver may also receive, process and provide satellite or other types of programming to the television as necessary. The output of the receiver's modulator may switch back and forth as a user changes between local broadcast and satellite channels. Further, an EPG may be provided that includes information for both programming sources in an integrated fashion.

13 Claims, 3 Drawing Sheets ns relate generally to television receivers, and more specifically to a television receiver having multiple inputs and a modulator capable of switching between these inputs.

MULTIPLE INPUT TELEVISION RECEIVER

CROSS-REFERENCE TO RELATED APPLICATIONS

This patent application claims the benefit of U.S. provisional application No. 61/317,843, filed Mar. 26, 2010, and entitled "MULTIPLE INPUT TELEVISION RECEIVER", the contents of which are incorporated herein by reference in their entirety.

TECHNICAL FIELD

Embodiments disclosed herein relate generally to television receivers, and more specifically to a television receiver having multiple inputs and a modulator capable of switching between these inputs.

BACKGROUND

Generally, modern audiovisual programming may be supplied through a number of different networks. For example, a satellite content provider may transmit programming to a set-top box across a satellite network. Likewise, local television providers may broadcast content terrestrially.

In many cases, a consumer may have a television receiver (such as the aforementioned set-top box) to receive a first type of programming and an antenna to receive a second type of programming, namely terrestrial broadcasts. This may be cumbersome for a user, requiring the user to interact with the television receiver when viewing the first type of programming but forcing the user to ignore the television receiver when viewing terrestrial broadcasts. Instead, when viewing a terrestrial broadcast, the user may need to change channels on a television or other type of display connected to the antenna. Since the user switches back and forth between devices and inputs, a seamless experience is not achieved.

SUMMARY

Embodiments are generally directed to a television receiver with multiple inputs, some accepting a local broadcast and some accepting satellite transmissions or transmissions across another network. The television receiver may pass local transmissions through to a display in their original form and at their original frequency, while retuning the display to receive the transmission at its original frequency. The television receiver may also receive, process and provide satellite or other types of programming to the television as necessary. The output of the receiver's modulator may switch back and forth as a user changes between local broadcast and satellite channels. Further, an EPG may be provided that includes information for both programming sources in an integrated fashion.

One embodiment is directed to an apparatus for receiving and outputting multiple types of signals, comprising: a first input receiving a first signal; a second input receiving a second signal; processing circuitry operatively connected to the first input and operative to process the first signal, thereby creating a processed signal; a modulator operatively connected to the second input and to the processing circuitry; wherein the modulator is operative to output at least one of the second signal and processed signal.

Another embodiment is directed to a method of providing output from a multiple input television receiver, comprising: receiving a command to change from a first state to a second state; determining to which of a first and second input signal the second state corresponds; in the event the second state corresponds to the first input signal, processing the first input signal to create a processed signal; in the event the second state corresponds to the first input signal, outputting the processed signal; and in the event the second state corresponds to the second input signal, outputting the second input signal.

Still another embodiment is directed to a method of providing electronic programming data to a television receiver, comprising: compiling a first channel list, the first channel list including all channels available through an antenna associated with a first input signal at a television receiver; compiling a second channel list, the second channel list including all channels available through an antenna associated with a second input signal at a television receiver; and merging the first and second channel lists into a electronic programming guide data; and transmitting the electronic programming guide data from a service provider to the television receiver.

DETAILED DESCRIPTION

Figure 1:
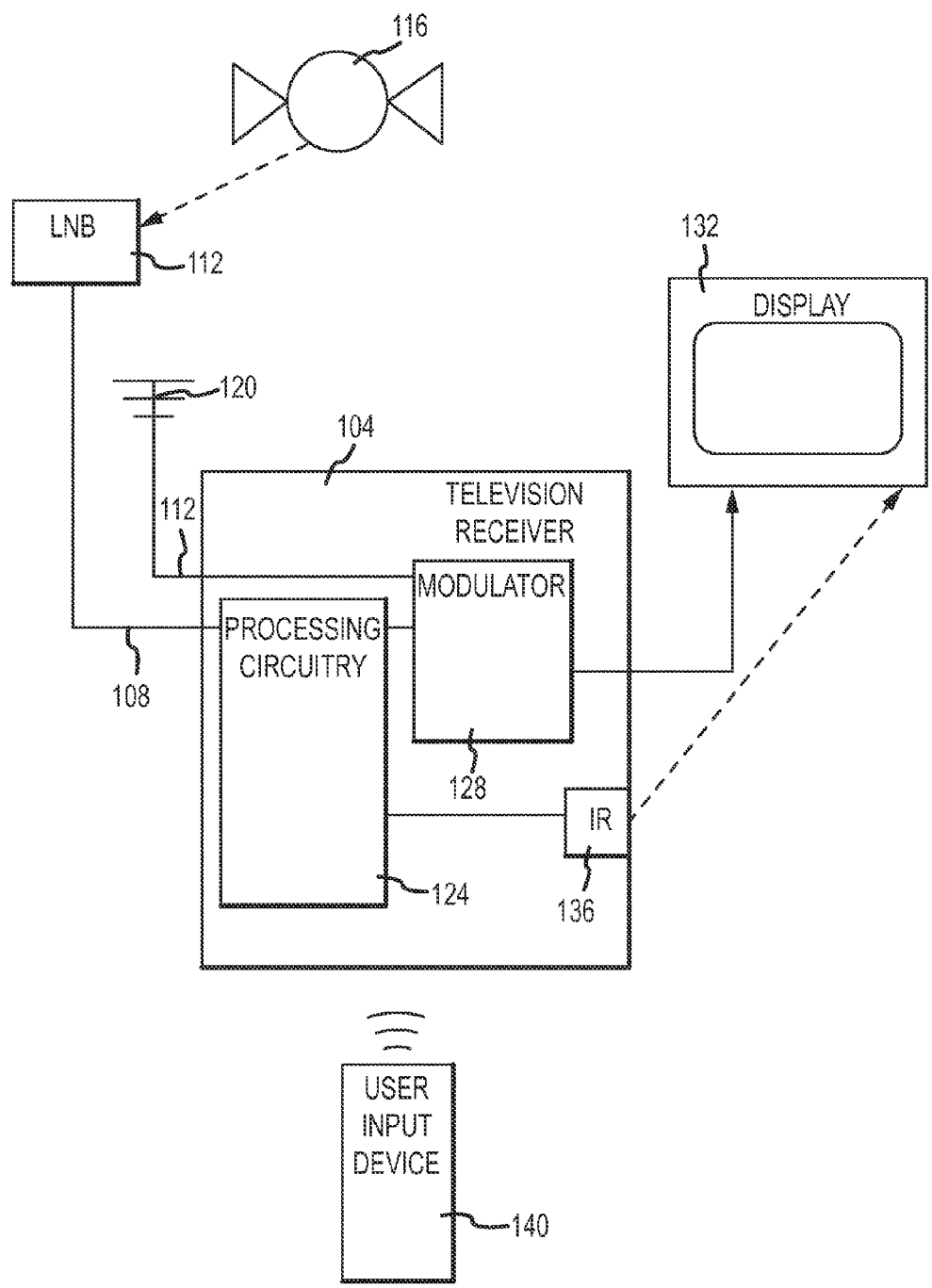
FIG. 1 depicts a sample television receiver in a sample operating environment.

Generally, embodiments discussed herein may facilitate viewing content delivered across multiple input streams in a seamless or relatively seamless fashion. As one example, a television receiver may be configured to receive a plurality of programs, each program carried on a unique input transmission, where each transmission is received across a different medium or at a different frequency. As a user tunes or otherwise configures the television receiver, the receiver may display a program associated with the input and/or transmission to which the receiver is tuned/configured. This occurs through operation of the television receiver in response to user input.

As one example of the foregoing, the television receiver may be a set-top box with a local broadcast antenna input and a satellite broadcast input. Both the local broadcast input and the satellite broadcast input may be connected to a modulator within (or, in some cases, outside) the set-top box. The set-top box may receive a collection of data streams (e.g., packet identifiers or "PIDs") across a transponder of a satellite. These PIDs, together, may make up a channel or program and be assigned to a particular identifier, such as a channel number. The set-top box, an electronic program guide associated with the set-top box, or another external programming facility or signal may assign the PID group to a particular channel.

Continuing the example, a second set of data may be received via the local broadcast antenna; this second set of data may make up a second channel or program. The second set of data may be assigned to a second identifier, such as a different channel number. Thus, a first channel may correspond to a satellite broadcast and a second channel to a terrestrial broadcast.

As a user selects the first channel, the set-top box may process the PIDs normally and thus output the corresponding satellite content to a display. When the user switches to the second channel, the set-top box may issue a command to the display to tune to a channel number corresponding to the second channel. This command may be transmitted through an infrared ("IR") transmitter, for example. The set-top box may likewise output the data from the corresponding terrestrial broadcast through a modulator. In order to do so, the set-top box may pass the data through the modulator while switching the modulator from the satellite broadcast input to the terrestrial broadcast input. Thus, the set-top box acts as a pass-through for the terrestrial broadcast and also instructs the display to tune to the appropriate frequency to show the terrestrial broadcast. (Since the frequency of the terrestrial broadcast typically is not modified by the set-top box, the display may tune to the corresponding channel to show the broadcast.)

Accordingly, the switching of broadcast/cannel types is handled by the set-top box and does not require the user to directly switch inputs. This, in turn, provides a relatively seamless user experience as a channel change command has the effect of showing a desired channel, regardless of the type of input corresponding to that channel.

FIG. 1 depicts a sample television receiver 104 in a sample operating environment. Here, the television receiver 104 is a set-top box, although alternative embodiments may take the form of a cable box, television with appropriately configured receiver circuitry, analog to digital television converter, and so on. Generally, the television receiver 104 includes a satellite input 108 and an antenna input 112, and may have additional inputs depending on the embodiments (such as a cable input, USB port, Ethernet input, network input and so on).

The satellite input 108 is connected to a satellite ante dish and low noise block feedhorn 112, illustrated in FIG. 1 as the block labeled "LNB," which receive transmissions from a satellite 116. The satellite transmission is received by the LNB, which in turn may frequency convert the satellite signal and transmit it to the television receiver 104 along a cable connected to the satellite input 108. The operation of LNBs is well understood by those of ordinary skill and so will not be discussed further herein.

Similarly, the antenna input 112 is connected to an antenna 120 configured to receive transmissions, such as terrestrial transmissions carrying local broadcasts. These broadcasts may be received by the antenna 120 and relayed to the television receiver across a cable connected to the antenna input 112. Accordingly, it can be seen that the television receiver may accept both satellite and local broadcasts, each of which are transmitted at a different frequency and/or according to a different frequency modulation scheme. Thus, multiple different inputs may be received, processed and outputted by embodiments described herein.

Typically, data carried on the satellite transmission is formatted and otherwise manipulated by circuitry within the television receiver 104. Such circuitry is represented in FIG. 1 by the box labeled "processing circuitry" 124. Data formatting and/or manipulation may include such operations as bandstacking, frequency conversion, modulation, demodulation, processing of MPEG-1, -2, and/or -4 data, and so on. Processing circuitry 124 may thus include demodulators, modulators, bandstacking circuitry, one or more storages such as a memory, one or more processors and so on.

The processed satellite data is provided to a modulator 128. The modulator 128 is shown in FIG. 1 as being within the television receiver 104, but in alternative embodiments the modulator may be outside the receiver 104, plugged into the receiver or otherwise separate from the receiver 104.

By contrast, data received from the local antenna 112 is not processed by the processing receiver circuitry 124. Instead, it is provided in its received or "raw" form to the modulator 128.

The modulator 128 may function as a data switch with multiple inputs and (in this case) a single output. The modulator 128 transmits one of the processed satellite data and local antenna data to an output or display device 132. The display 132 may take the data received and present it to a user. Data may be, for example, audiovisual content. In alternative embodiments, the modulator 128 may have multiple outputs, each of which may be connected to a separate display. In some cases, multiple modulator outputs may be connected to a single display in order to provide "picture in picture," split screen, or other multiple-data viewing functionality.

In addition to the foregoing, the television receiver 104 may include an infrared transmitter 136 or transceiver (referred to herein as an "IR transmitter"). The IR transmitter may emit a command, as an infrared waveform, to the display 132. The command may instruct the display 132 to change or tune to a different channel, for example. Thus, when the user changes from a satellite channel to a local broadcast channel, the modulator 128 may switch inputs and pass through the local broadcast transmission and associated data, which typically is already formatted and at a frequency corresponding to the selected channel. Further, the IR transmitter 136 may send a command to the television to tune away from the channel on which satellite transmissions are normally displayed and to the channel selected by the user.

In this manner, the user may instruct the television receiver 104 to change channels and, when a local broadcast channel is selected, the television receiver 104 may relay that instruction to the television and pass through the raw local feed for display. Embodiments discussed herein may employ a single channel on the television 132 to display all content received from the satellite, retuning and/or passing through selected PIDs to show a user-selected channel as necessary, and use other channels on the television to display over-the-air broadcasts that are passed through the television receiver 104 without processing. Accordingly, the user experience is seamless as the television receiver remote 140 may be used for all channel selection, a single electronic programming guide ("EPG") may be displayed for both satellite and local channels, and the user need not personally retune the television 132 when selecting a local channel.

Figure 2:
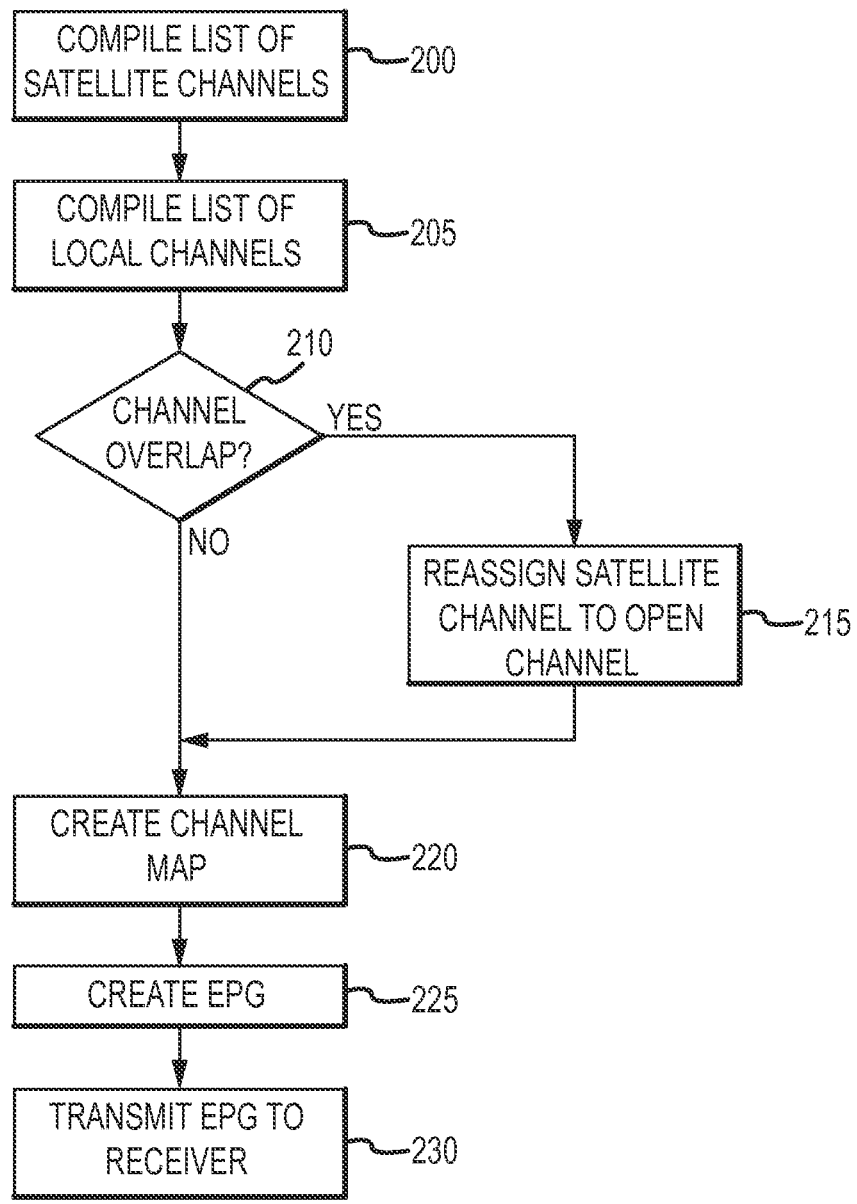
FIG. 2 is a flowchart generally showing how a satellite content provider may implement an EPG and channel map to operate with the television receiver of FIG. 1.

FIG. 2 is a flowchart generally showing how a satellite content provider may implement an EPG and channel map to operate with the television receiver 104 of FIG. 1. It should be noted that this is but one possible method for creating an EPG and others may exist without departing from the spirit or scope of this document.

In operation 200, the content provider (such as the provider of the satellite transmission or operator of the satellite network) may compile a list of all satellite channels. A satellite "channel," as used herein, refers to a collection of PIDs that, taken together, show a specific program associated with a particular timeslot and programming source, such as HBO, FOX, ESPN, and so forth. The "channel" is thus not necessarily a particular frequency on which content or other data is transmitted, but instead a collection of data streams that are commonly associated.

In operation 205, the content provider may compile a list of local channels. A "local channel" is one that is terrestrially broadcast at a particular frequency, typically in the UHF or VHF bands. A local broadcast channel, then, is associated with a specific frequency. Typically, different local channels are broadcast at different frequencies of the broadcast spectrum.

As can be seen from the foregoing, when a set-top box or other television receiver switches to a different satellite channel, it selects a different group of PIDs for processing and display. By contrast, when a local channel is selected and passed through the modulator for display, the display itself retunes to the proper frequency to receive the local channel data. This is discussed in more detail below with respect to FIG. 3.

Once the list of satellite and local channels have been compiled, the content provider may determine in operation 210 if any satellite channels overlap any local channels. That is, if a satellite channel and local channel both have the same channel designation (for example, the same channel number), then they are considered to overlap. In the event of such an overlap, in operation 215 the content provider may reassign the satellite channel to another, open channel designation on the satellite channel list. In alternative embodiments, the local broadcast channel may be reassigned. If there is no overlap or after operation 215, operation 220 is executed.

In operation 220, the content provider may create the channel map by merging the list of satellite channels and list of local channels. This merged list may be used in operation 225 to create an EPG which, in turn, may be transmitted to the television receiver in operation 230. The transmission of an EPG across a network is well known to those skilled in the art. The EPG created in operation 225 typically, although not necessarily, includes program information for both satellite and local broadcast channels. Accordingly, when a user of the television receiver displays the EPG, it may show programming information for both types of channels. The EPG may therefore be considered a "unified EPG" insofar as it embraces both satellite and local broadcast channels and programming.

It should be noted that several operations in the method of FIG. 2 are described as being performed by a content provider. In actuality, these operations may be automated and performed by a computing device owned and/or operated by a content provider. In alternative operations, the television receiver may include circuitry operative to execute operations 200-220 (and, optionally, operation 225), thereby creating a "virtual EPG" specific to the television receiver in question by dynamically remapping a list of satellite channels received from a content provider and a list of local channels detected across the local antenna input. The list of satellite channels may be provided in the form of an EPG supplied by the content provider.

Figure 3:
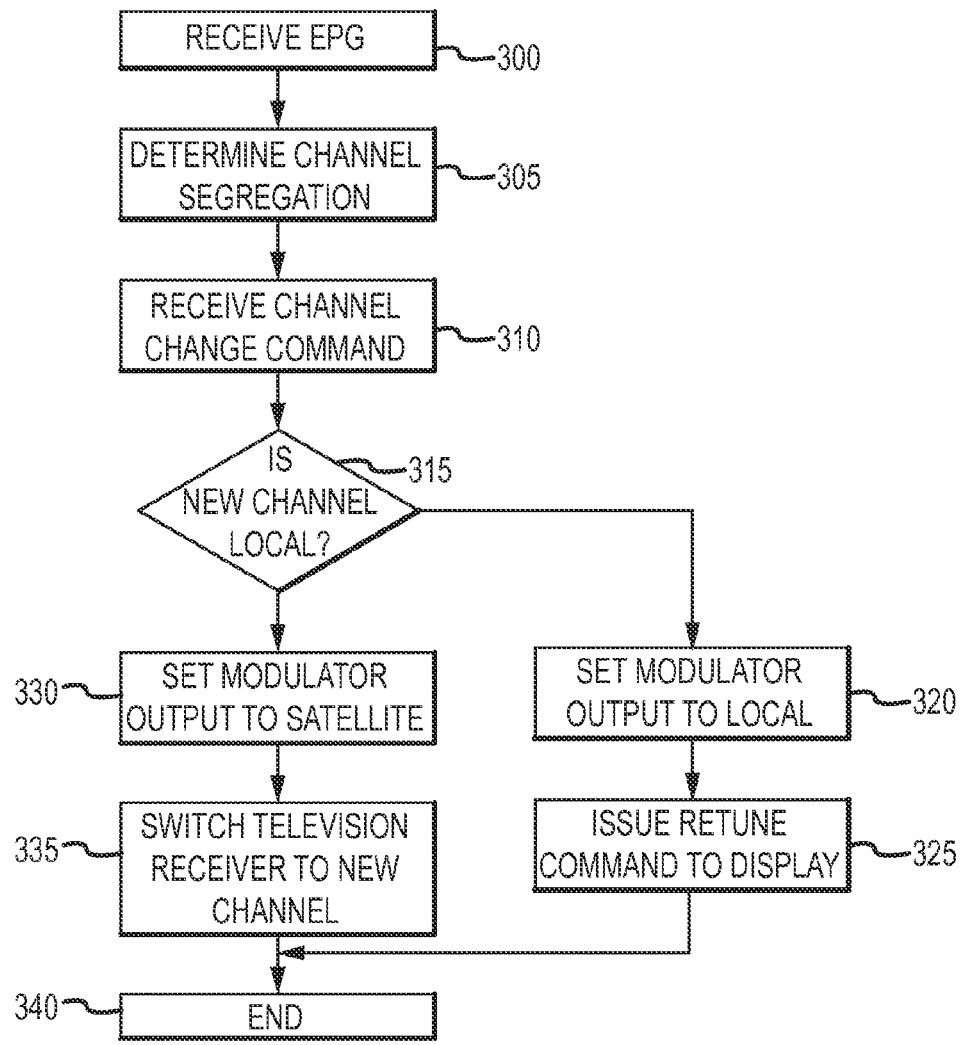
FIG. 3 depicts a method for changing between channels utilizing a television receiver described with respect to FIG. 1.

FIG. 3 depicts a method for changing between channels utilizing a television receiver described with respect to FIG. 1. Initially, in operation 300, the television receiver receives and processes the EPG from the content provider. In operation 305, the television receiver may determine a channel segregation for the channels of the EPG. That is, the television receiver may determine which channels listed in the EPG are provided through satellite transmission and which channels are provided through local broadcast. This information may be contained in the EPG or may be determined by the television receiver locally.

As one example of local determination, the television receiver may scan for local broadcasts received on the local antenna input. Since each received local broadcast occupies a particular frequency band, the television receiver generally may determine from the frequency band a corresponding channel for the local broadcast. The television receiver may presume that all other channels are satellite channels.

In operation 310, the television receiver receives a channel change command from a user. In response, the receiver determines in operation 315 if the newly selected channel is local. If so, operation 320 is accessed and the modulator is set to provide the selected local channel to the display. That is, the modulator (and television receiver) act as a pass-through for the local broadcast channel. In operation 325, the television receiver issues a command to the display to change the channel to which the display is tuned. Generally, the television receiver instructs the display to change to the channel corresponding to the local broadcast channel selected by the user in operation 310. Since the local broadcast is passed through the television receiver and modulator without any processing, the display is thus properly tuned to display and receive it.

Following operation 325, the method terminates in end state 340.

If the television receiver determines in operation 315 that the newly-selected channel is not local (e.g., is a satellite channel), then operation 330 is accessed and the modulator is set to provide a satellite output to the display. In operation 335, the television receiver is "retuned" to select PIDs corresponding to the newly-selected channel. These PIDs are processed by the television receiver and provided to the display through the modulator. Since the display has not changed the channel to which it is tuned, it continues to receive data from the television receiver on the appropriately assigned channel or input. Many displays are configured to receive outputs from television receivers on channel 3 or 4, for example, or on a particular audio/video input.

Following operation 335, the method terminates in end state 340.

As can be seen from the foregoing, a single television receiver may be provided with multiple inputs, some accepting a local broadcast and some accepting satellite transmissions or transmissions across another network. The television receiver may pass local transmissions through to a display in their original form and at their original frequency, while retuning the display to receive the transmission at its original frequency. Further, the television receiver may continue to operate in a standard mode, receiving, processing and providing satellite programming to the television as necessary. The output of the receiver's modulator may switch back and forth as a user changes between local broadcast and satellite channels. Further, an EPG may be provided that includes information for both programming sources in an integrated fashion.

Generally, embodiments herein have been described with respect to satellite transmissions and networks. It should be appreciated that alternative embodiments may operate with different or additional networks, such as a cable network, the Internet, an Ethernet or other local network, and so forth.

Although particular apparatuses, examples and methods have been described herein, variations will be apparent to those of ordinary skill in the art upon reading this disclosure. Thus, the proper scope of the disclosure is set forth in the accompanying claims.

While embodiments are discussed herein in connection with the exemplary satellite broadcast system shown in FIG. 1, it should be appreciated that embodiments may be used in connection other types of networks or content delivery mechanisms. Generally, the disclosure includes content delivered from a provider to a receiver across or over a network. The network across which content may be delivered may include satellite system, such as the one shown in FIG. 1. Alternatively, the network may include a cable television network, local area network, wide area network or the Internet. In connection with certain embodiments, a receiver may include a general purpose computer operable to receive data or other content across a network, such as a wide area network of the internet. In such embodiments, the computer may be configured so that a provider can access a web site, a file transfer protocol (FTP) site, a file sharing system or site, and so on. Moreover, the order of method operations, such those shown in FIG. 2 and FIG. 3, described herein is by way of example and limitation. Certain implementations may reorder method operations without departing from the spirit and scope of the disclosure.

The invention claimed is:

1. An apparatus for receiving and outputting multiple types of signals, comprising:
   a first input receiving a first signal;
   a second input receiving a second signal comprising an over-the-air transmission;
   processing circuitry operatively connected to the first input and operative to process the first signal, thereby creating a processed signal;
   a modulator operatively connected to the second input and to the processing circuitry; wherein the modulator is operative to output at least one of the second signal and processed signal; and
   an infrared transmitter connected to the processing circuitry, the infrared transmitter configured to automatically send a channel change command to a display device when the modulator outputs the second signal.

2. The apparatus of claim 1, wherein the modulator is operative to output both of the second signal and the processed signal.

3. The apparatus of claim 2, wherein the modulator outputs both of the second signal and the processed signal in response to a signal requesting a picture-in-picture display.

4. The apparatus of claim 1, wherein the first signal is a satellite television transmission.

5. The apparatus of claim 1, wherein the first signal is a cable television transmission.

6. A method of providing output from a multiple input television receiver, comprising:
   receiving a command to change from a first state to a second state at first device;
   receiving electronic programming guide data for a plurality of channels;
   determining a channel segregation that indicated which of the plurality of channels in the electronic programming guide correspond to a first input signal and which correspond to a second input signal, wherein the determination comprises:
      scanning for local broadcast channels on an antenna associated with the second signal,
      assigning any local broadcast channel to the second input signal, and
      assigning any channels in the electronic programming guide data not found in the scanning operation to the first input signal;
   determining to which of the first and second input signal the second state corresponds by referencing the channel segregation;
   in the event the second state corresponds to the first input signal, processing the first input signal to create a processed signal;
   in the event the second state corresponds to the first input signal, outputting the processed signal;
   in the event the second state corresponds to the second input signal, issuing a channel change command to an output device, the channel change command instructing the output device to tune to a frequency corresponding to the second state; and
   outputting the second input signal.

7. The method of claim 6, further comprising:
   in the event the second state corresponds to the second input signal, issuing a channel change command to an output device, the channel change command instructing the output device to tune to a frequency dedicated to receiving the first input signal.

8. The method of claim 7, wherein the frequency dedicated to receiving the first input signal corresponds to a channel 3 or 4 at the output device.

9. The method of claim 6, further comprising:
   compiling a first channel list, the first channel list including all channels available through an antenna associated with the first input signal;
   compiling a second channel list, the second channel list including all channels available through an antenna associated with the second input signal; and
   merging the first and second channel lists into a virtual electronic programming guide.

10. The method of claim 9, further comprising:
    determining that a channel in the first channel list and a channel in the second channel list overlap; and
    reassigning one of the channel in the first channel list and the channel in the second channel list to a non-overlapping channel.

11. The method of claim 6, wherein the first input signal is a satellite television transmission.

12. The method of claim 6, wherein the first input signal is a cable television transmission.

13. The method of claim 6, wherein the second input signal is a local television transmission.

* * * * *

UNITED STATES PATENT AND TRADEMARK OFFICE
CERTIFICATE OF CORRECTION

PATENT NO. : 8,793,737 B2  
APPLICATION NO. : 13/072346  
DATED : July 29, 2014  
INVENTOR(S) : Markus Wayne Jackson Page 1 of 1

It is certified that error appears in the above-identified patent and that said Letters Patent is hereby corrected as shown below:

In the Claims

Claim 6, column 7, line 39, delete "indicated" and insert -- indicates --.

Claim 6, column 7, line 41, between "guide" and "correspond", insert -- data --.

Claim 6, column 7, line 45, between "second" and "signal", insert -- input --.

Claim 6, column 8, line 13, between "command" and "to", insert -- from the first device --.

Signed and Sealed this  
Sixteenth Day of December, 2014

Michelle K. Lee  
*Deputy Director of the United States Patent and Trademark Office*